United States Patent [19]
Harker

[11] 3,791,063

[45] Feb. 12, 1974

[54] METHOD OF CASTING

[76] Inventor: William Edmund Harker, Midland Hotel, Derby, England

[22] Filed: Dec. 8, 1972

[21] Appl. No.: 313,539

Related U.S. Application Data

[62] Division of Ser. No. 56,811, July 21, 1970, abandoned.

[52] U.S. Cl. .................................................. 43/4.5
[51] Int. Cl. ............................................ A01k 69/00
[58] Field of Search ............................. 43/4.5, 18 R

[56] References Cited
UNITED STATES PATENTS
2,601,351    6/1952    Wilburn .............................. 43/18 R

*Primary Examiner*—Louis G. Mancene
*Assistant Examiner*—J. Q. Lever
*Attorney, Agent, or Firm*—Cushman, Darby & Cushman

[57] ABSTRACT

A method of casting a line and fly when fishing by means of a fishing rod having a detachable handle, the detachable handle having a reel attached thereto, comprising the steps of separating the detachable handle carrying the reel from the rest of the rod, and holding the detachable handle with the reel in one hand and the rest of the rod in the other hand, the reel being restrained to prevent rotation thereof, making a back cast, bringing the hands near each other with the reel restrained, releasing the reel, and immediately thereafter making a forward cast with the hand holding the rod, while simultaneously drawing the other hand holding the detachable handle and reel away from the hand holding the rod, thus accelerating the reel ready to pay out line, permitting line to pay out, and reconnecting the detachable handle to the rest of the rod after the line and fly have dropped on the water in front of the angler, and retrieving the line by winding the line on the reel.

3 Claims, 2 Drawing Figures

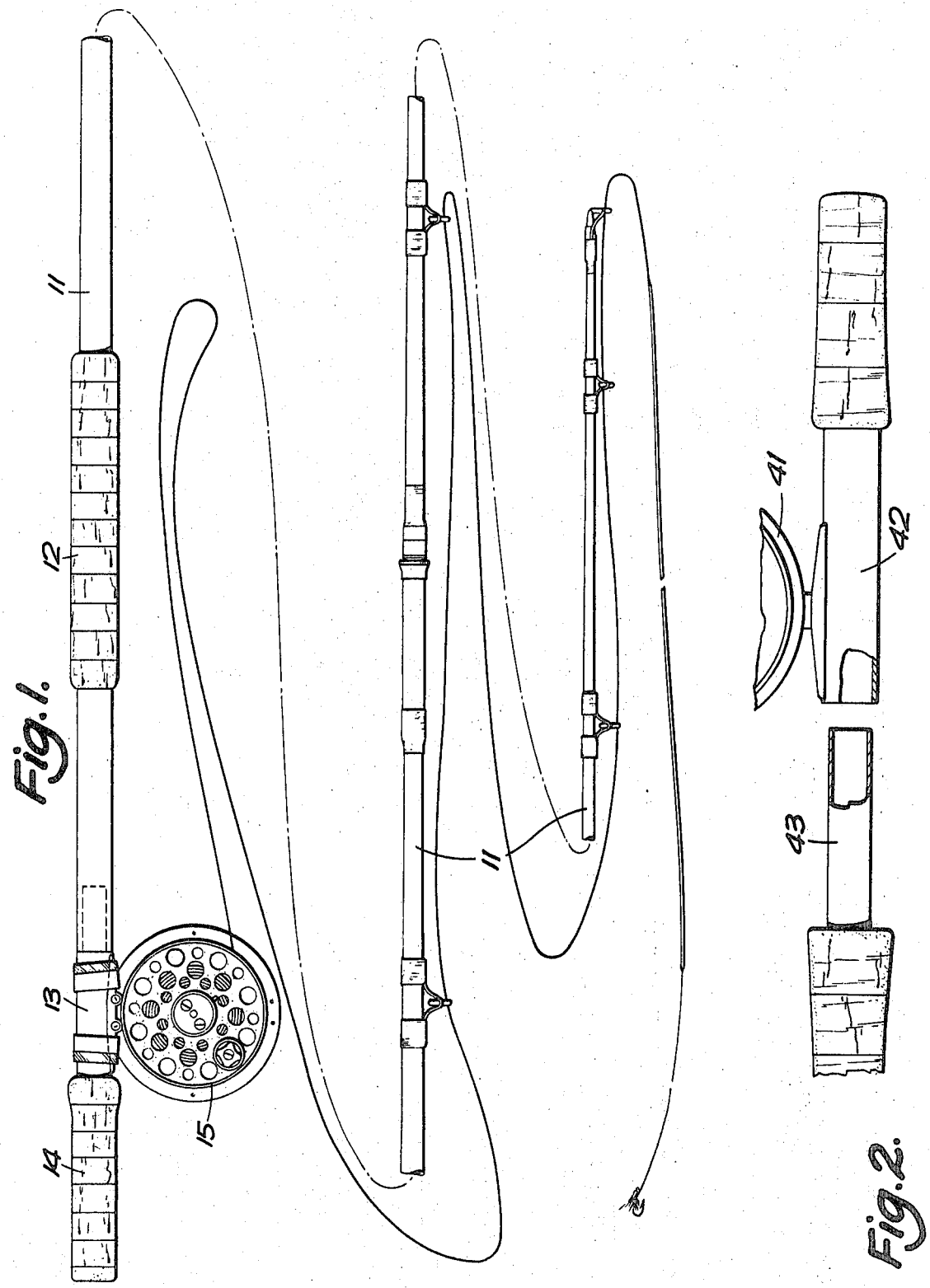

METHOD OF CASTING

This application is a division of Ser. No. 56,811, filed July 21, 1970, now abandoned.

The invention relates to a method of casting using a fly fishing rod.

Presently used fly fishing techniques for long distance casting, for example in reservoirs, involve the use of a "casting head" consisting of a length of relatively heavy casting line which is attached to a much lighter running line. The weight of the casting head and the speed at which it is cast, produce the necessary momentum to carry the line a long distance.

However to effect as long a cast as possible it is necessary to impart to the line more energy than can be achieved by moving the rod with one hand, and resort has to be had to pulling the line with one hand while moving the rod with the other. This has brought about the development of a technique according to which the running line is coiled on the ground or water, where a raft or bucket may be necessary, and after casting is pulled in by hand to form coils ready for the next cast. While this technique can be successfully used under ideal conditions, in practice the coiled line often becomes entangled and fish may break away while the line is being retrieved by hand.

It is an object of the present invention to provide a method of casting which avoids these disadvantages.

The invention provides a method of casting a line and fly when fishing by means of a fishing rod having a detachable handle, the detachable handle having a reel attached thereto, comprising the steps of separating the detachable handle carrying the reel from the rest of the rod, and holding the detachable handle with the reel in one hand and the rest of the rod in the other hand, the reel being restrained to prevent rotation thereof, making a back cast, bringing the hands near each other with the reel restrained, releasing the reel, and immediately thereafter making a forward cast with the hand holding the rod, while simultaneously drawing the other hand holding the detachable handle and reel away from the hand holding the rod, thus accelerating the reel ready to pay out line, permitting line to pay out, reconnecting the detachable handle to the rest of the rod after the line and fly have dropped on the water in front of the angler, and retrieving the line by winding the line on the reel.

A specific embodiment of the invention will now be described with reference to the accompanying drawings, in which:

FIG. 1 is a general view of a fly rod capable of use according to the invention; and FIG. 2 is a general view of a second embodiment of rod.

Referring to FIG. 1, a fly rod is made from a tapered tube 11 of resin bonded glass fibres fitted at its larger diameter end with a cork handle portion 12 surrounding the tube. The detachable handle part is formed from a short length of tapered resin bonded glass fibre tube 13, the end of which remote from the rod proper is fitted with a cork handle portion 14. The projecting portion of the tube 13 forms a pin or spigot dimensioned to fit within the large diameter end of the tube 11 to form a tapering push-fit connecting between the two handle portions of the rod. A revolving spool reel 15 is mounted on the detachable part of the handle, being of the type which can run free of checks.

FIG. 2 shows a second embodiment of rod in which a reel 41 is permanently bonded to the detachable handle 42, the handle 42 being a push fit over the butt end of the rod 43. This construction may bring about a reduction in cost.

Although the embodiments shown in FIGS. 1 and 2 incorporate a tapered pin and socket joint between the detachable handle and the fixed handle it will be understood that any suitable quick release joint may be used.

The method of construction described permitting the rod and reel to be separated during use, allows of the reel being made to accelerate to such a speed that on delivery of the forward cast the reel is paying out line at approximately the same speed as the running line beyond the rod tip is travelling through the air. Thus there is little or no drag on the line from the reel and a very long cast can be achieved. The force required to accelerate the reel during the cast is balanced by the pull of the casting head which is being accelerated through the air, so that a state of dynamic equilibrium exists.

Experiments have shown that long casts of more than 30 metres can be achieved, and it has been found that the presentation of the fly is improved as the line is nicely extended in a straight line, and this can be controlled by the caster exerting pressure on the reel to slow it down.

A further advantage of the invention is that when making long casts the weight of the reel is not carried by the casting arm so that the cast is more effective and more easily made.

In a further method of casting the procedure is the same as in the method just described except that during the back-cast the spool is held by the left thumb to prevent rotation and at the same time the left hand is drawn away from the right hand which movement gives to the casting head an initial acceleration towards the rod to help the back cast. At the end of the back cast the hands are once again moved close together ready to begin the forward cast.

It will be appreciated that in order to carry out the method according to the invention the joint between the rod and the detachable handle must be of a quick release type.

I claim

1. A method of casting a line and fly when fishing by means of a fishing rod having a detachable handle, the detachable handle having a reel attached thereto, comprising the steps of:
   a. separating the detachable handle carrying the reel from the rest of the rod, and holding the detachable handle with the reel in one hand and the rest of the rod in the other hand, the reel being restrained to prevent rotation thereof;
   b. making a back cast;
   c. bringing the hands near each other with the reel restrained;
   d. releasing the reel, and immediately thereafter making a forward cast with the hand holding the rod, while simultaneously drawing the other hand holding the detachable handle and reel away from the hand holding the rod, thus accelerating the reel ready to pay out line, permitting line to pay out;
   e. reconnecting the detachable handle to the rest of the rod after the line and fly have dropped on the water in front of the angler; and
   f. retrieving the line by winding the line on the reel.

2. A method as claimed in claim 1 in which the hands are kept close to one another during the back cast.

3. A method as claimed in claim 1 in which at the beginning of the back cast the hands are drawn away from one another to give the line an initial acceleration towards the rod to help the back cast.

\* \* \* \* \*